(12) United States Patent
Warren

(10) Patent No.: US 10,077,992 B2
(45) Date of Patent: Sep. 18, 2018

(54) TIP CLEARANCE PROBE INCLUDING ANTI-ROTATION FEATURE

(75) Inventor: Eli Cole Warren, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 1783 days.

(21) Appl. No.: 13/600,299

(22) Filed: Aug. 31, 2012

(65) Prior Publication Data

US 2014/0064925 A1 Mar. 6, 2014

(51) Int. Cl.
| | | |
|---|---|---|
| G01D 11/16 | (2006.01) |
| F01D 21/04 | (2006.01) |
| G01B 21/16 | (2006.01) |
| F01D 21/00 | (2006.01) |

(52) U.S. Cl.
CPC .......... *G01D 11/16* (2013.01); *F01D 21/04* (2013.01); *G01B 21/16* (2013.01); *F01D 21/003* (2013.01)

(58) Field of Classification Search
CPC ........ F01D 21/003; F01D 21/04; F01D 11/20; G01B 7/14; G01B 11/14; G01B 21/16; G01D 11/16
USPC .......................................................... 415/118
See application file for complete search history.

(56) References Cited

U.S. PATENT DOCUMENTS

| | | | |
|---|---|---|---|
| 4,329,644 A * | 5/1982 | Libertini ................. F01D 17/06 324/160 |
| 4,501,095 A | 2/1985 | Drinkuth et al. |
| 4,804,905 A * | 2/1989 | Ding ........................ G01B 7/14 174/152 GM |
| 5,583,443 A | 12/1996 | McMurtry et al. |
| 5,652,446 A | 7/1997 | Sakao |
| 5,818,242 A * | 10/1998 | Grzybowski ......... F01D 11/025 324/642 |
| 6,717,418 B2 | 4/2004 | Orenstein |
| 7,207,769 B2 * | 4/2007 | Tanioka ................... F01D 11/24 415/115 |
| 7,215,129 B1 | 5/2007 | Andarawis et al. |
| 8,230,726 B2 | 7/2012 | Hafner |
| 2010/0171491 A1* | 7/2010 | Chana ..................... G01H 1/003 324/207.25 |
| 2011/0243708 A1 | 10/2011 | Hafner |

* cited by examiner

*Primary Examiner* — Jason Shanske
*Assistant Examiner* — Julian Getachew
(74) *Attorney, Agent, or Firm* — Carlson, Gaskey & Olds, P.C.

(57) ABSTRACT

A tip clearance probe includes at least one anti-rotation feature within the probe housing that prevents a sensor component from rotating when the tip clearance probe fails due to extraordinary wear and tear.

21 Claims, 5 Drawing Sheets

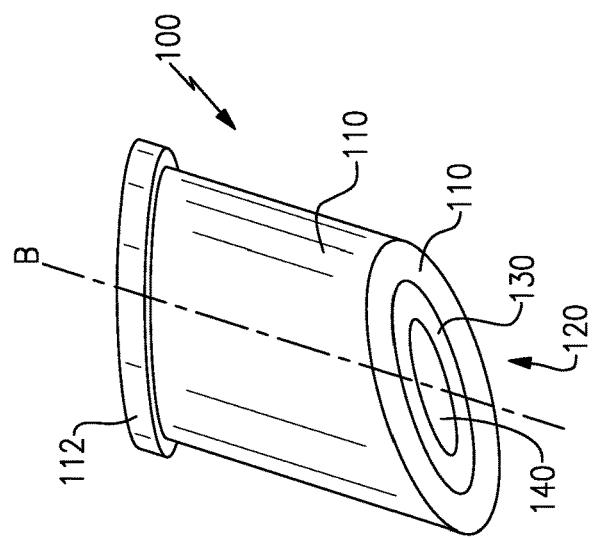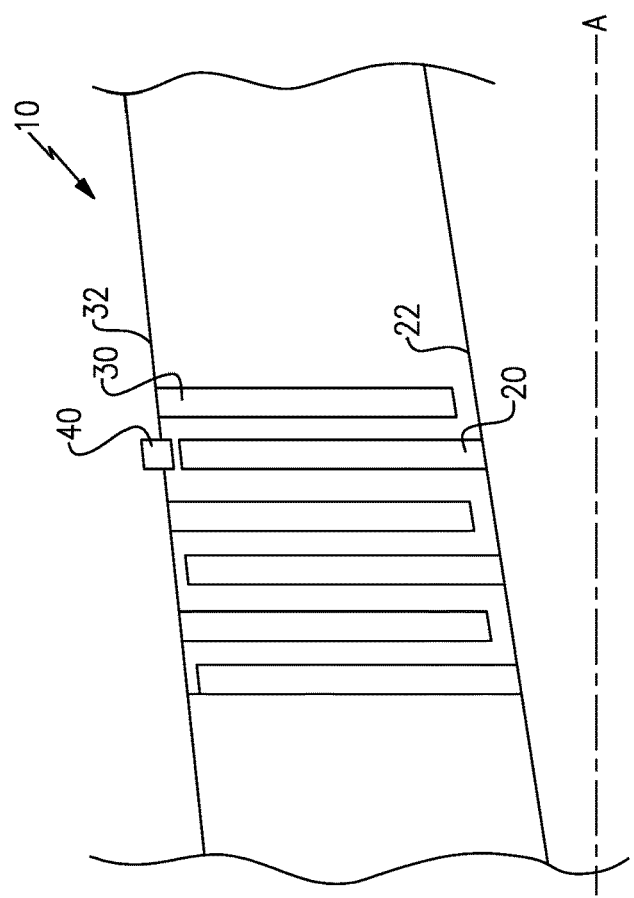

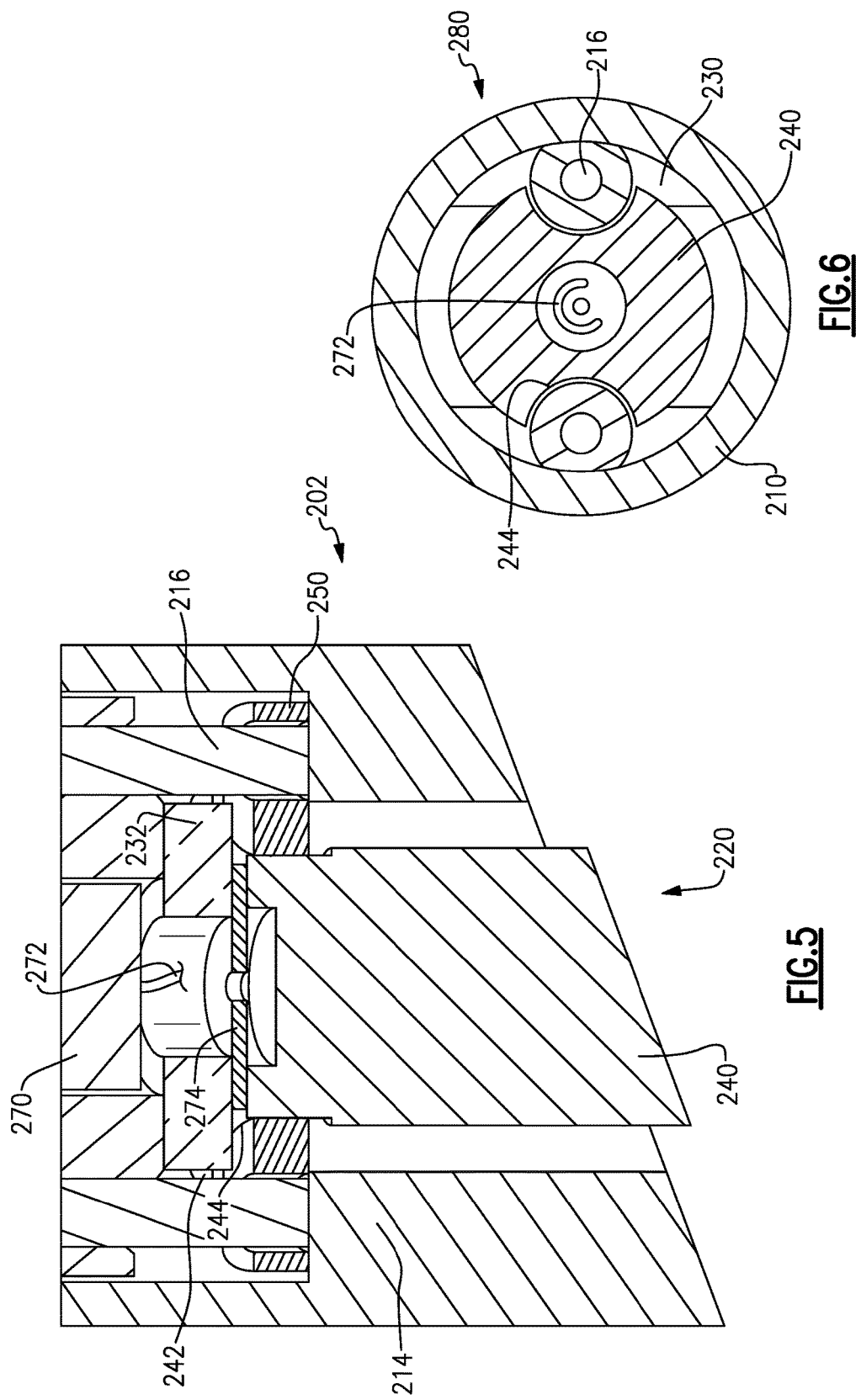

TIP CLEARANCE PROBE INCLUDING ANTI-ROTATION FEATURE

TECHNICAL FIELD

The present disclosure relates generally to tip clearance probes for turbine engines, and more particularly to a tip clearance probe including an anti-rotation feature.

BACKGROUND OF THE INVENTION

Gas turbine engines, such as those utilized in commercial aircraft, include multiple rotors and stators configured to enable optimal operation. Turbine engines maintain an optimal clearance (distance) between the tips of the rotors and an outside diameter of the gas path, and thereby provide the conditions necessary to achieve a desired performance.

The gas turbine performance is validated, in part, by measuring the blade tip clearance. In order to measure the tip clearance, one or more tip clearance probes are used to measure the rotor tip clearances. Over time, natural vibrations, and other wear and tear, damages the tip clearance probes. In one typical failure mode, an insulator breaks thus allowing the sensor component to drop from the tip clearance probe toward the rotor tips. As the sensor component drops, it is not uncommon for the sensor component to rotate. When a tip clearance probe has an angled sensor face, rotation of the sensor component can dramatically decrease the clearance between the sensor components and the rotor tips being monitored. If the clearance decreases too much, the tip clearance probe interferes with the rotors, exacerbating the damage beyond a failed sensor.

SUMMARY OF THE INVENTION

A tip clearance probe according to an exemplary embodiment of this disclosure, among other possible things includes a housing defining an axis, a sensor component retained within the housing, a sensor face on a first axial end of the housing, the sensor face is angled relative to the axis, and an anti-rotation feature within the housing, the anti-rotation feature is operable to prevent the sensor component from rotating about the axis.

In a further embodiment of the foregoing tip clearance probe the anti-rotation feature comprise, at least one anti-rotation pin aligned with the axis, and at least one anti-rotation insulator interfacing with the sensor component and engaged with one of the at least one anti-rotation pins.

In a further embodiment of the foregoing tip clearance probe the sensor component comprises at least one shaped opening operable to receive the anti-rotation insulator.

In a further embodiment of the foregoing tip clearance probe each of the anti-rotation insulators comprises a center opening shaped to receive one of the anti-rotation pins.

In a further embodiment of the foregoing tip clearance probe each of the at least one anti-rotation pins comprises a rod defining an axis, and the axis is aligned with the tip clearance probe axis.

In a further embodiment of the foregoing tip clearance probe, the tip clearance probe further comprising at least one insulator within the housing, the insulator contacts a sensor component and a housing wall and is operable to maintain the sensor component within the housing.

In a further embodiment of the foregoing tip clearance probe, the housing comprises an internal catching lip feature operable to catch the sensor component when the insulator fails.

In a further embodiment of the foregoing tip clearance probe the insulator is a ceramic insulator.

In a further embodiment of the foregoing tip clearance probe, the tip clearance probe further comprises a tip clearance probe cap on a second axial end of the housing, and each component between the tip clearance probe cap and the sensor face is maintained under a compressional force.

A method for preventing rotation of a sensor component within a sensor housing according to an exemplary embodiment of this disclosure, among other possible things includes allowing a sensor component to drop a set distance and catching a portion of the sensor component using a housing feature such that the sensor component does not drop out of the housing, and preventing the sensor component from rotating as the sensor component drops using at least one anti-rotation pin and at least one retention feature engaged with the sensor component.

In a further embodiment of the foregoing method, the step of allowing a sensor component to drop a set distance and catching a portion of the sensor component using a housing feature such that the sensor component does not drop out of the housing further comprises allowing the retention feature and the anti-rotation pin to drop the set distance.

In a further embodiment of the foregoing method, the step of allowing a sensor component to drop a set distance and catching a portion of the sensor component using a housing feature such that the sensor component does not drop out of the housing occurs when a insulator for maintaining the sensor component within the housing experiences a failure.

In a further embodiment of the foregoing method, the step of preventing the sensor component from rotating as the sensor component drops using at least one anti-rotation pin and at least one retention feature engaged with the sensor component comprises each of the anti-rotation pins contacting an edge of an opening in the sensor component receiving the anti-rotation pin.

A turbine engine according to an exemplary embodiment of this disclosure, among other possible things includes a gas path including a plurality of rotors and stators, a clearance probe configured to detect a clearance between at least one of the rotors and an outer air seal of the gas path, wherein the clearance probe comprises, a housing defining a tip clearance probe axis, a sensor component retained within the housing, a sensor face on a first axial end of the housing, the sensor face is angled relative to the axis, and an anti-rotation feature within the housing, the anti-rotation feature is operable to prevent the sensor component from rotating about the axis.

In a further embodiment of the foregoing turbine engine, the anti-rotation feature comprise at least one anti-rotation pin aligned with the tip clearance probe axis, at least one anti-rotation insulator interfacing with the sensor component and engaged with one of the at least one anti-rotation pins.

In a further embodiment of the foregoing turbine engine, the sensor component comprises at least one shaped opening operable to receive the anti-rotation insulator.

In a further embodiment of the foregoing turbine engine each of the anti-rotation insulators comprises at least one retention ring, and a center opening of the retention ring is shaped to receive one of the anti-rotation pins.

In a further embodiment of the foregoing turbine engine each of the at least one anti-rotation pins comprises a rod defining a rod axis, and the rod axis is aligned with the tip clearance probe axis.

In a further embodiment of the foregoing turbine engine, the turbine engine further comprises at least one insulator within the housing, the insulator contacts a sensor component and a housing wall and is operable to maintain the sensor component within the housing.

In a further embodiment of the foregoing turbine engine the housing comprises an internal catching lip feature operable to catch the sensor component when the insulator fails.

These and other features of the present invention can be best understood from the following specification and drawings, the following of which is a brief description.

BRIEF DESCRIPTION OF THE DRAWINGS

FIG. 1 schematically illustrates a portion of an angled gas path for an exemplary turbine engine.

FIG. 2 schematically illustrates an isometric view of an example angled tip clearance probe.

FIG. 5 schematically illustrates a sensor portion of the example tip clearance probe of FIG. 3 after a typical failure.

FIG. 6 illustrates a second cross sectional view of the tip clearance probe of FIG. 3 illustrating the anti-rotational components.

DETAILED DESCRIPTION

Figure 3:
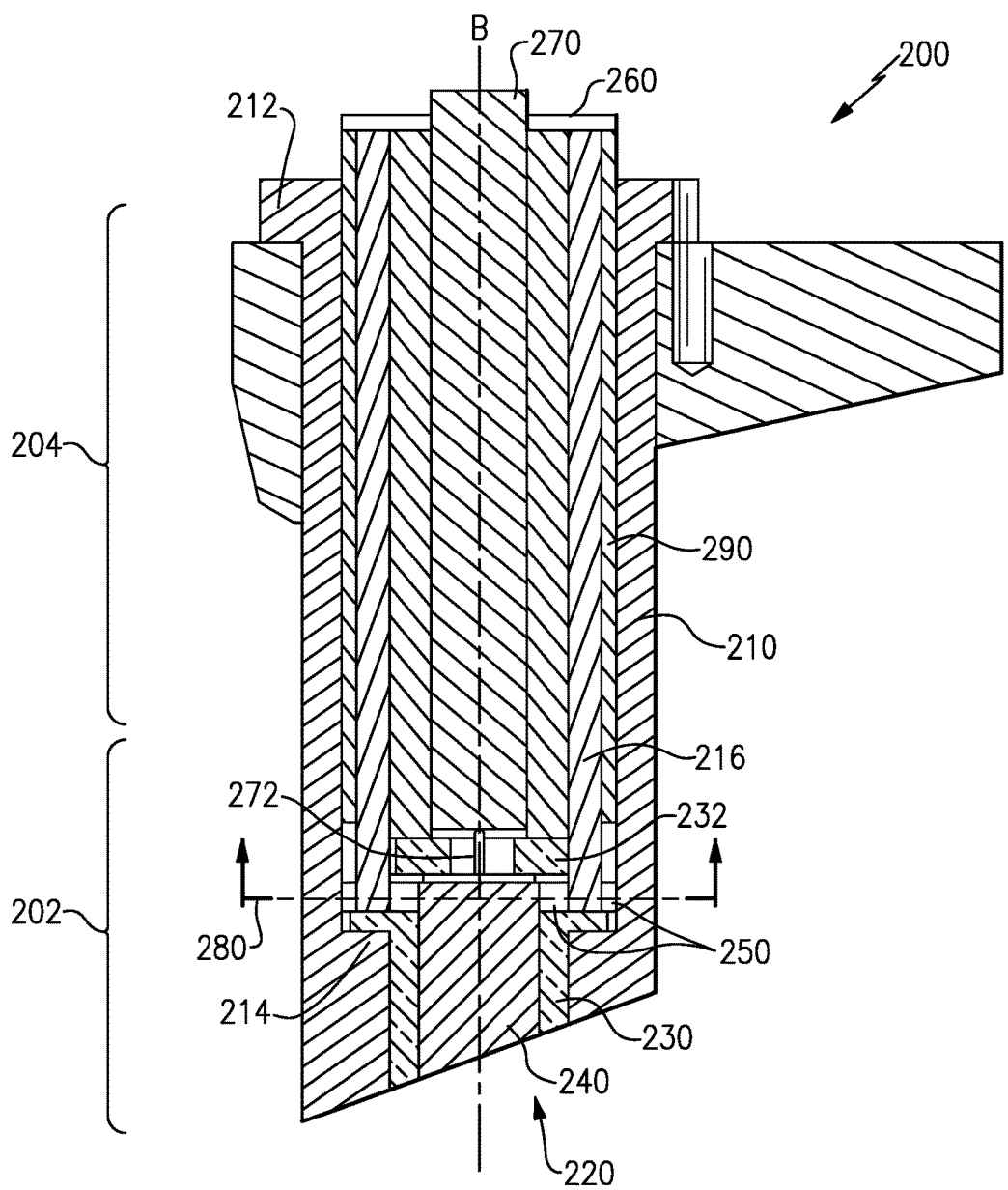
FIG. 3 schematically illustrates a first cross sectional view of an example tip clearance probe.

FIG. 1 illustrates a portion of a gas path 10 for a turbine engine. The gas path 10 includes multiple rotors 20 extending from an inner air seal 22. The gas path 10 also includes multiple stators 30 extending from an outer air seal 32. The rotors 20 are shaped in order to either compress the gas or rotate due to expanding gases depending on the portion of the gas turbine engine in which the rotors 20 are located. In order to measure the clearances between the blade tips and outer air seals 32, a tip clearance probe 40 is included in the outer air seal 32. The tip clearance probe 40 monitors the clearances between the outer air seal 32 and a corresponding rotor 20. In some example turbine engines, multiple tip clearance probes 40 are utilized. Due to turbine engine construction constraints the tip clearance probes 40 include an angled sensor face (illustrated in FIGS. 2-5).

One such tip clearance probe 40 is illustrated via a schematic isometric view of an example tip clearance probe 100 in FIG. 2. The tip clearance probe 100 has a housing 110 containing a sensor component 140 and at least one ceramic insulator 130 maintaining the sensor component 140 in place within the housing 110. The housing 110 also includes a lip feature 112 on one axial end. The lip feature 112 is a mounting feature and allows the tip clearance probe 100 to be mounted to the turbine engine. The tip clearance probe 100 is generally cylindrical and defines an axis B.

As with any mechanical component, wear from continued use within an operating turbine engine may result in the failure of one or more components within the tip clearance probe 100. In some example tip clearance probes 100, the ceramic insulator 130 holding the sensing component 140 in place is likely to be the first internal component of the tip clearance probe 100 to fail due to operational wear and tear. When the ceramic insulator 130 breaks, the ceramics crumble and the sensor component 140 drops into the gap where the ceramic insulator 130 was prior to failure. Prior to the sensor component 140 dropping out of the tip clearance probe 100 entirely, internal housing features catch the sensor component 140 via a sensor component lip, alternately referred to as a top-hat portion. The sensor component 140 drops a known distance when this type of failure occurs. The drop distance is calculated into the tolerances of the turbine engine design.

Tip clearance probes 100 with an angled sensor face 120, such as the illustrated example, can exacerbate the required tolerances if the sensor component 120 is allowed to rotate as it drops. In order to prevent rotation of the sensor component 120 from occurring, an internal anti-rotation feature is (or multiple internal anti-rotation features are) included within the tip clearance probe 100.

FIG. 3 illustrates a first cross sectional view of a tip clearance probe 200 cut along a plane parallel to an axis B defined by the tip clearance probe 200. In one example configuration, each of the anti-rotation pins 216 is aligned with and parallel to the axis B. In another example, each of the anti-rotation pins 216 is aligned with, but slightly out of parallel with the axis B. As with the example of FIG. 2, the tip clearance probe 200 includes a probe housing 210 with a lip shaped mounting feature 212. The housing further includes an internal catching lip 214 that catches a sensor component 240, should the sensor component 240 drop. The tip clearance probe 200 can generally be divided into two regions: a sensor region 202, and a support/housing region 204. The two regions are purely explanatory and do not denote structural features of the tip clearance probe 200.

Within the sensor region 202, is a sensor component 240. The sensor component 240 is maintained in position within the housing 210 by a first ceramic insulator 230 and a second ceramic insulator 232. The sensor component 240, the first ceramic insulator 230, and the housing 210 terminate in an angled sensor face 220. Also within the sensor region 202 are two anti-rotation insulators 250. Each of the anti-rotation insulators 250 interfaces with the sensor component 240 and one of two anti-rotation pins 216.

Within the support/housing region 204 is an electric lead 270. The electric lead 270 is connected to the sensor component 240 via a sensor wire 272. Two anti-rotation pins 216 are approximately parallel to the axis B defined by the tip clearance probe 200. Each anti-rotation pin 216 extends from an axial end of the tip clearance probe 200 to the first ceramic insulator 230 through an anti-rotation insulator 250. A cap 260 is placed on the axial end of the tip clearance probe's 200 support/housing region 204 and maintains the internal components of the tip clearance probe 200 under a compressive force. The cap 260 can be attached to the housing 210 via any known technique, such as welding or press fitting.

The axial overlap of each pin 216 and its corresponding anti-rotation insulator 250 is sufficiently long so as to continue engagement if the anti-rotation insulator 250 drops.

Figure 4:
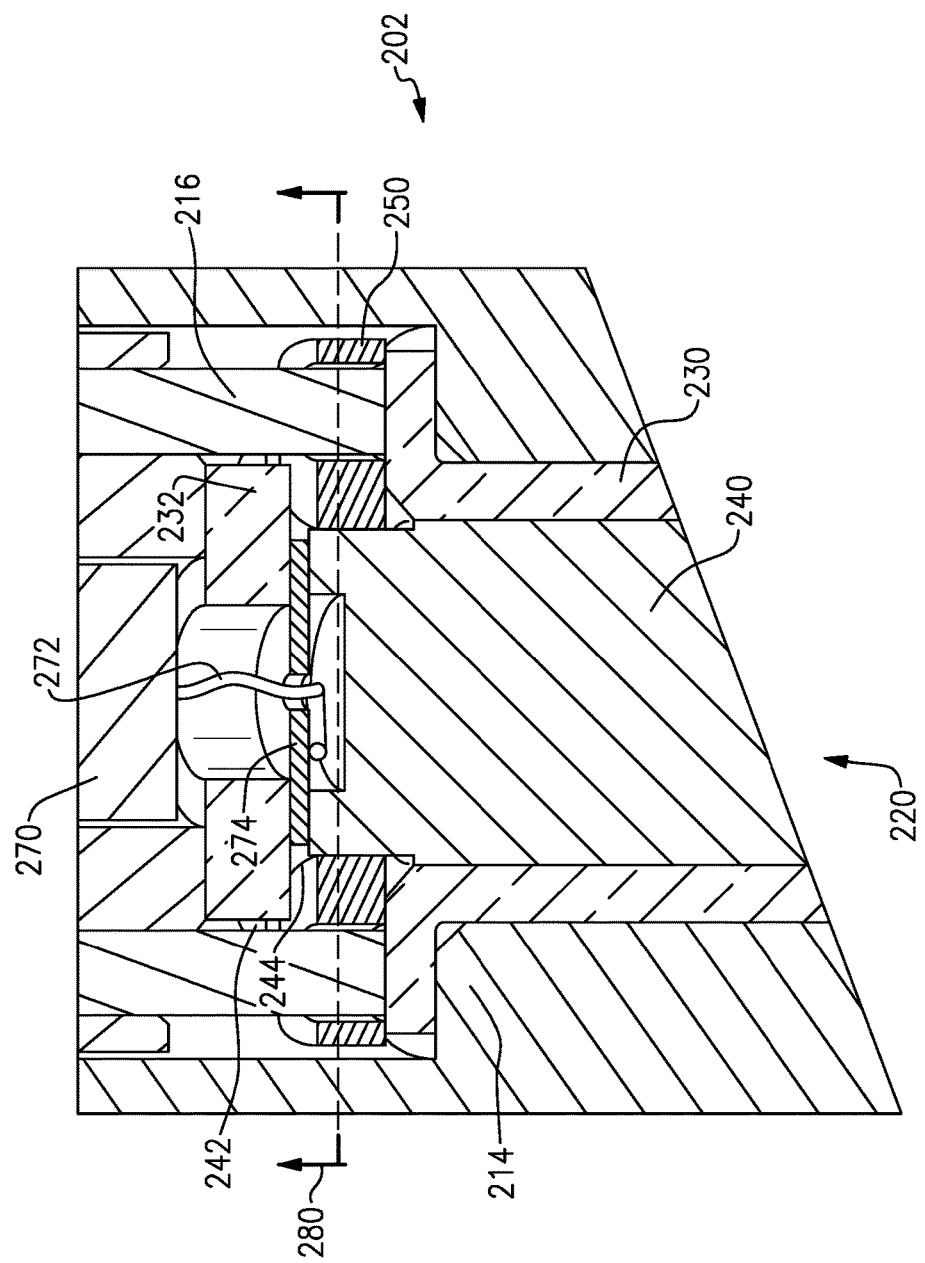
FIG. 4 schematically illustrates a sensor portion of the example tip clearance probe of FIG. 3 during standard operation.

With continued reference to FIG. 3, FIG. 4 illustrates a zoomed in view of the sensor region 202 of the tip clearance probe 200 in an operational state. FIG. 5 illustrates a zoomed in view of FIG. 4 after a failure within the tip clearance probe 200 due to extreme wear and tear. When referring to FIGS. 3, 4, and 5, like numerals indicate like elements. The zoomed in view of FIGS. 4 and 5 provides a more detailed view of the sensor region 202 of the tip clearance probe 200. The sensor component 240 includes a tophat portion that provides a lip 242. Multiple openings 244 are cut out of the lip 242 and each opening is shaped to receive one anti-rotation insulator 250. The anti-rotation insulators 250 are each received within an opening 244. In the illustrated example, the anti-rotation insulator 250 is ring shaped and the opening 244 is a round cut out of the sensor component 240. The anti-rotation pins 216 each pass through the hole in one of the anti-rotation insulators 250. The top ceramic insulator 232 applies a compressive pressure on a strap 274. The strap 274 holds the sensor wire 272 in contact with the sensor component 240.

During operation of the turbine engine, the most likely internal component of the tip clearance probe 200 to fail is the lower ceramic insulator 230. When the ceramic insulator 230 fails, the ceramics crumble and drop out of the tip clearance probe 200 through the sensor face 220. When this occurs, the sensor component 240 and both of the anti-rotation insulators 250 drop along the axis B and are caught by the internal retention lip 214 of the housing 210. The drop causes the sensor wire 272 to break, thereby alerting an external controller in communication with the tip clearance probe 200 that the tip clearance probe 200 has failed.

Figure 8:
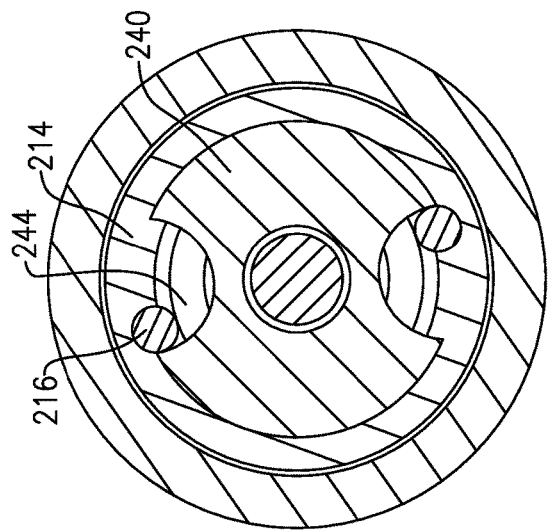
FIG. 8 schematically illustrates a cross sectional view of the tip clearance probe of FIG. 7.
Figure 7:
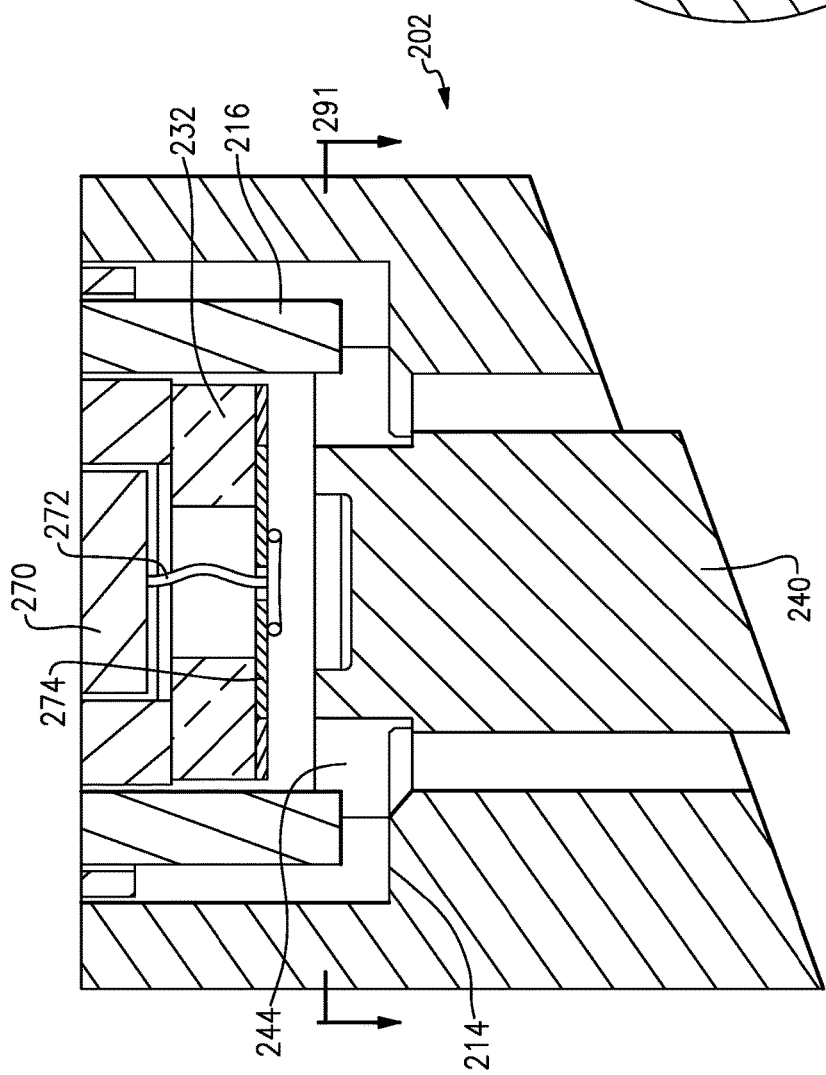
FIG. 7 schematically illustrates a sensor portion of the example tip clearance probe after an alternate failure.

FIG. 7 schematically illustrates an alternate failure of the example tip clearance probe 200. In the alternate failure, one or more of the anti-rotation insulators 250 additionally crumbles and falls from the sensor region 202. When the anti-rotation insulator 250 crumbles, the sensor component 240 is allowed to rotate a minimal distance, after which the anti-rotation pins hit the edges of the openings 244 and the sensor component 240 is prevented from further rotation. FIG. 8 further illustrates the arrangement of FIG. 7, cut along a sectional line 291 (illustrated in FIG. 7). Thus, even in the alternated, more severe, failure of FIG. 7 the rotation of the sensor component 240 within the tip clearance probe 200 is minimized.

As described above, each of the anti-rotation pins 216 is held axially by the cap 260, and cannot shift circumferentially about the axis B, and the anti-rotation pins 216 are engaged with the anti-rotation insulators 250. The anti-rotation insulator 250 is received in the opening 244 of the sensor component 240. The mechanical interaction between the anti-rotation pins 216, the anti-rotation insulators 250 and the sensor component opening 244 prevents the sensor component from rotating about axis B as the sensor component drops, thereby minimizing the tolerances required by the tip clearance probe 200.

With continued reference to FIGS. 3-5, and with like numerals indicating like elements, FIG. 6 illustrates another sectional view of the tip clearance probe 200 cut along a view line 280, illustrated in FIGS. 3 and 4. The sensor component top hat portion 242 is visible. As can be seen in the illustration of FIG. 6, the openings 244 in the sensor component 240 are shaped to receive the anti-rotation insulators 250. The anti-rotation pins 216 extend through the center of the anti-rotation insulators 250.

While the above described example tip clearance probe 200 includes two anti-rotation insulators 250 and two anti-rotation pins, a person of ordinary skill in the art having the benefit of this disclosure would be able to construct a similar system using a single anti-rotation pin or more than two anti-rotation pins.

Furthermore, while the upper insulator 232 and the lower insulator 230 are described as being ceramic insulators, it is understood that the insulators 230, 232 could be constructed of alternate materials aside from ceramics.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tip clearance probe comprising:
   a housing defining an axis;
   a sensor component retained within said housing;
   a sensor face on a first axial end of said housing, wherein said sensor face is angled relative to said axis; and
   an anti-rotation feature within said housing, wherein said anti-rotation feature is operable to prevent said sensor component from rotating about said axis.

2. The tip clearance probe of claim 1, wherein said anti-rotation feature comprises:
   at least one anti-rotation pin aligned with said axis; and
   at least one anti-rotation insulator interfacing with said sensor component and engaged with one of said at least one anti-rotation pins.

3. The tip clearance probe of claim 2, wherein said sensor component comprises at least one shaped opening operable to receive said at least one anti-rotation insulator.

4. The tip clearance probe of claim 2, wherein each of said at least one anti-rotation insulators comprises a center opening shaped to receive one of said at least one anti-rotation pins.

5. The tip clearance probe of claim 2, wherein each of said at least one anti-rotation pins comprises a rod defining a rod axis, and wherein said rod axis is aligned with said housing axis.

6. The tip clearance probe of claim 1, further comprising at least one insulator within said housing, wherein said at least one insulator contacts the sensor component and a housing wall and is operable to maintain said sensor component within said housing.

7. The tip clearance probe of claim 6, wherein said housing comprises an internal catching lip feature operable to catch said sensor component when said at least one insulator fails.

8. The tip clearance probe of claim 6, wherein said at least one insulator is a ceramic insulator.

9. The tip clearance probe of claim 1, further comprising a tip clearance probe cap on a second axial end of said housing, and wherein any component between said tip clearance probe cap and said sensor face is maintained under a compressional force.

10. A method for preventing rotation of a sensor component within a sensor housing comprising the steps of:
    allowing a sensor component to drop a set distance and catching a portion of the sensor component using a housing feature such that said sensor component does not drop out of said housing; and
    preventing said sensor component from rotating as the sensor component drops using at least one anti-rotation pin and at least one retention feature engaged with said sensor component.

11. The method of claim 10, wherein said step of allowing a sensor component to drop a set distance and catching a portion of the sensor component using a housing feature such that said sensor component does not drop out of said housing further comprises allowing said retention feature and said at least one anti-rotation pin to drop said set distance.

12. The method of claim 10, wherein said step of allowing a sensor component to drop a set distance and catching a portion of the sensor component using a housing feature such that said sensor component does not drop out of said housing occurs when an insulator for maintaining said sensor component within said housing experiences a failure.

13. The method of claim 10, wherein said step of preventing said sensor component from rotating as the sensor component drops using at least one anti-rotation pin and at least one retention feature engaged with said sensor component comprises each of said anti-rotation pins contacting an edge of an opening in the sensor component receiving the at least one anti-rotation pin.

14. A turbine engine comprising:
   a gas path including a plurality of rotors and stators;
   a clearance probe configured to detect a clearance between at least one of said rotors and an outer air seal of said gas path, wherein said clearance probe comprises;
      a housing defining a tip clearance probe axis;
      a sensor component retained within said housing;
      a sensor face on a first axial end of said housing, wherein said sensor face is angled relative to said axis; and
      an anti-rotation feature within said housing, wherein said anti-rotation feature is operable to prevent said sensor component from rotating about said axis.

15. The turbine engine of claim 14, wherein said anti-rotation feature comprises:
   at least one anti-rotation pin aligned with said tip clearance probe axis; and
   at least one anti-rotation insulator interfacing with said sensor component and engaged with one of said at least one anti-rotation pins.

16. The turbine engine of claim 15, wherein said sensor component comprises at least one shaped opening operable to receive said at least one anti-rotation insulator.

17. The turbine engine of claim 15, wherein each of said anti-rotation insulators comprises at least one retention ring, and wherein a center opening of said at least one retention ring is shaped to receive one of said at least one anti-rotation pins.

18. The turbine engine of claim 15, wherein each of said at least one anti-rotation pins comprises a rod defining a rod axis, and wherein said rod axis is aligned with said tip clearance probe axis.

19. The turbine engine of claim 14, further comprising at least one insulator within said housing, wherein said at least one insulator contacts the sensor component and a housing wall and is operable to maintain said sensor component within said housing.

20. The turbine engine of claim 19, wherein said housing comprises an internal catching lip feature operable to catch said sensor component when said at least one insulator fails.

21. The tip clearance probe of claim 1, wherein said sensor face is a planar sensor face.

* * * * *